(12) United States Patent
Malmborg et al.

(10) Patent No.: US 10,995,632 B2
(45) Date of Patent: May 4, 2021

(54) DAMPED AIRFOIL FOR A GAS TURBINE ENGINE

(71) Applicant: United Technologies Corporation, Farmington, CT (US)

(72) Inventors: Eric W. Malmborg, Amston, CT (US); Donald A. Jacques, Tolland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 46 days.

(21) Appl. No.: 16/297,936

(22) Filed: Mar. 11, 2019

(65) Prior Publication Data

US 2020/0291815 A1 Sep. 17, 2020

(51) Int. Cl.
| | |
|---|---|
| *F01D 25/06* | (2006.01) |
| *F01D 5/14* | (2006.01) |
| *F01D 5/26* | (2006.01) |
| *F01D 9/04* | (2006.01) |
| *F02C 3/04* | (2006.01) |
| *F02K 3/06* | (2006.01) |

(52) U.S. Cl.
CPC ............. *F01D 25/06* (2013.01); *F01D 5/147* (2013.01); *F01D 5/26* (2013.01); *F01D 9/041* (2013.01); *F02C 3/04* (2013.01); *F02K 3/06* (2013.01); *F05D 2220/32* (2013.01); *F05D 2230/60* (2013.01); *F05D 2240/123* (2013.01); *F05D 2260/96* (2013.01)

(58) Field of Classification Search
CPC . F01D 25/04; F01D 25/06; F01D 5/26; F01D 5/147; F01D 5/00; F01D 5/14; F01D 5/16; F01D 5/18; F05D 2240/123; F05D 2240/305; F05D 2260/96
See application file for complete search history.

(56) References Cited

U.S. PATENT DOCUMENTS

| | | |
|---|---|---|
| 4,188,811 A | 2/1980 | Brimm |
| 5,063,662 A | 11/1991 | Porter et al. |
| 5,269,058 A | 12/1993 | Wiggs et al. |
| 5,634,771 A | 6/1997 | Howard et al. |
| 5,947,688 A | 9/1999 | Schilling et al. |

(Continued)

FOREIGN PATENT DOCUMENTS

GB 2073631 10/1981

*Primary Examiner* — David E Sosnowski
*Assistant Examiner* — Danielle M. Christensen
(74) *Attorney, Agent, or Firm* — Carlson, Gaskey & Olds, P.C.

(57) ABSTRACT

An airfoil for a gas turbine engine according to an example of the present disclosure includes, among other things, an airfoil section extending in a spanwise direction, extending between a leading edge and a trailing edge in a chordwise direction, and extending in a thickness direction between a pressure side and a suction side. The airfoil section has a main body and a first skin. The main body includes a plurality of ribs defining a plurality of internal channels. The first skin is attached to the main body to enclose the plurality of internal channels such that the main body and the first skin cooperate to define the pressure and suction sides. A damper has at least one layer of damping material sandwiched between the first skin and the plurality of ribs. A method of forming a gas turbine engine component is also disclosed.

22 Claims, 6 Drawing Sheets

(56) References Cited

U.S. PATENT DOCUMENTS

| | | | |
|---|---|---|---|
| 6,033,186 A | 3/2000 | Schilling et al. | |
| 6,039,542 A | 3/2000 | Schilling et al. | |
| 6,544,002 B1 | 4/2003 | Evans et al. | |
| 7,025,568 B2 * | 4/2006 | Jones | F01D 5/16 29/889.72 |
| 7,237,709 B2 | 7/2007 | Beckford | |
| 7,296,977 B2 | 11/2007 | Bonnet | |
| 7,322,223 B2 | 1/2008 | Levers | |
| 7,993,105 B2 | 8/2011 | Weisse et al. | |
| 8,061,997 B2 * | 11/2011 | Le Hong | F01D 5/147 416/205 |
| 8,205,476 B2 | 6/2012 | Voice | |
| 8,256,118 B2 | 9/2012 | Cammer | |
| 8,763,360 B2 | 7/2014 | Murdock | |
| 8,821,124 B2 | 9/2014 | Veins et al. | |
| 8,857,054 B2 | 10/2014 | Goldfinch et al. | |
| 9,010,166 B2 | 4/2015 | Brennand | |
| 9,121,287 B2 | 9/2015 | Weisse et al. | |
| 9,556,742 B2 | 1/2017 | Parkin et al. | |
| 9,790,800 B2 | 10/2017 | Quigley | |
| 9,932,842 B2 * | 4/2018 | Hyatt | F01D 5/147 |
| 10,337,521 B2 * | 7/2019 | Roche | F04D 29/388 |
| 2014/0086737 A1 * | 3/2014 | Hyatt | F01D 9/041 415/208.1 |
| 2015/0252779 A1 * | 9/2015 | Sievers | F03D 1/0675 416/229 R |
| 2018/0318966 A1 | 11/2018 | Evans et al. | |

\* cited by examiner

DAMPED AIRFOIL FOR A GAS TURBINE ENGINE

BACKGROUND

This disclosure relates to a gas turbine engine, and more particularly to damping of gas turbine engine components.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion. Static guide vanes may be arranged to support one or more portions of the engine and set a direction of airflow.

Some airfoils are made of a metallic or composite material. Various techniques can be utilized to construct hollow airfoils, including attaching a cover skin to an airfoil body. The airfoils can be subject to vibration during engine operation.

SUMMARY

An airfoil for a gas turbine engine according to an example of the present disclosure includes an airfoil section extending in a spanwise direction, extending between a leading edge and a trailing edge in a chordwise direction, and extending in a thickness direction between a pressure side and a suction side. The airfoil section has a main body and a first skin. The main body includes a plurality of ribs defining a plurality of internal channels. The first skin is attached to the main body to enclose the plurality of internal channels such that the main body and the first skin cooperate to define the pressure and suction sides. A damper has at least one layer of damping material sandwiched between the first skin and the plurality of ribs.

In a further embodiment of any of the foregoing embodiments, the at least one layer of damping material comprises viscoelastic material.

In a further embodiment of any of the foregoing embodiments, the main body and the first skin are metallic.

In a further embodiment of any of the foregoing embodiments, the first skin defines a recess that is dimensioned to at least partially receive the at least one layer of damping material.

In a further embodiment of any of the foregoing embodiments, the at least one layer of damping material is attached to surfaces of the recess such that the at least one layer of damping material opposes movement of the first skin relative to the main body in at least one of the spanwise direction and the chordwise direction.

In a further embodiment of any of the foregoing embodiments, the damper includes a carrier that spans across and is attached to the plurality of ribs, and the at least one layer of damping material is attached to surfaces of the carrier.

In a further embodiment of any of the foregoing embodiments, a perimeter of the first skin is attached to the main body along an interface.

In a further embodiment of any of the foregoing embodiments, the damper has a carrier that spans across and is attached to the plurality of ribs. The at least one layer of damping material is attached to surfaces of the carrier. The first skin defines a recess dimensioned to at least partially receive the at least one layer of damping material and the carrier such that the at least one layer of damping material is sandwiched between surfaces of the recess and the surfaces of the carrier. The plurality of internal channels are hollow.

In a further embodiment of any of the foregoing embodiments, at least one layer of damping material includes first and second layers of viscoelastic material in stacked relation between the plurality of ribs and the surfaces of the recess. The first layer has a construction that differs in viscoelasticity from a construction of the second layer.

In a further embodiment of any of the foregoing embodiments, the plurality of ribs includes a first rib and a second rib. The damper is a first damper and a second damper. The first damper extends across the first rib. The second damper extends across the second rib. The at least one layer of damping material of the first damper differs in construction from the at least one layer of damping material of the second damper.

In a further embodiment of any of the foregoing embodiments, the airfoil is a guide vane.

In a further embodiment of any of the foregoing embodiments, the airfoil is a fan blade.

A gas turbine engine according to an example of the present disclosure includes a fan section, a compressor section, a combustor section in fluid communication with the compressor section, a turbine section that drives the compressor section and the fan section, and an array of airfoils circumferentially distributed about an engine longitudinal axis. Each airfoil of the array of airfoils includes an airfoil section that has a main body and a first skin. The main body has a plurality of ribs defining a plurality of internal channels. The first skin is attached to the main body to enclose the plurality of internal channels. A damper has at least one layer of damping material that spans across the plurality of ribs such that the at least one layer of damping material opposes movement of the first skin relative to the main body.

In a further embodiment of any of the foregoing embodiments, the at least one layer of damping material comprises viscoelastic material, and the main body and the first skin are metallic.

In a further embodiment of any of the foregoing embodiments, the first skin defines a recess. The at least one layer of damping material is attached to surfaces of the recess, and the plurality of internal channels are hollow.

In a further embodiment of any of the foregoing embodiments, the fan section comprises the array of airfoils, and the array of airfoils are an array of fan blades rotatable about the engine longitudinal axis.

In a further embodiment of any of the foregoing embodiments, the array of airfoils are guide vanes that set a direction of flow in the fan section and/or the compressor section.

A method of forming a gas turbine engine component according to an example of the present disclosure includes forming a plurality of internal channels in a main body between a plurality of internal ribs, positioning a damper that has at least one layer of viscoelastic material across the plurality of internal ribs, and attaching a first skin to the main body to sandwich the damper between the first skin and the plurality of ribs such that at least one layer of viscoelastic material opposes movement of the first skin relative to the main body.

In a further embodiment of any of the foregoing embodiments, the main body and the first skin are metallic.

In a further embodiment of any of the foregoing embodiments, the damper includes a carrier attached to the at least one layer of damping material, and the method further includes forming a recess in the first skin, attaching the at least one layer of damping material to surfaces of the recess, and attaching the carrier to the plurality of internal ribs such that the at least one layer of damping material is sandwiched between the surfaces of the recess and the carrier. The step of attaching the first skin to the main body includes attaching a perimeter of the first skin to the main body to enclose the plurality of internal channels.

The various features and advantages of this disclosure will become apparent to those skilled in the art from the following detailed description. The drawings that accompany the detailed description can be briefly described as follows.

DETAILED DESCRIPTION

Figure 1:
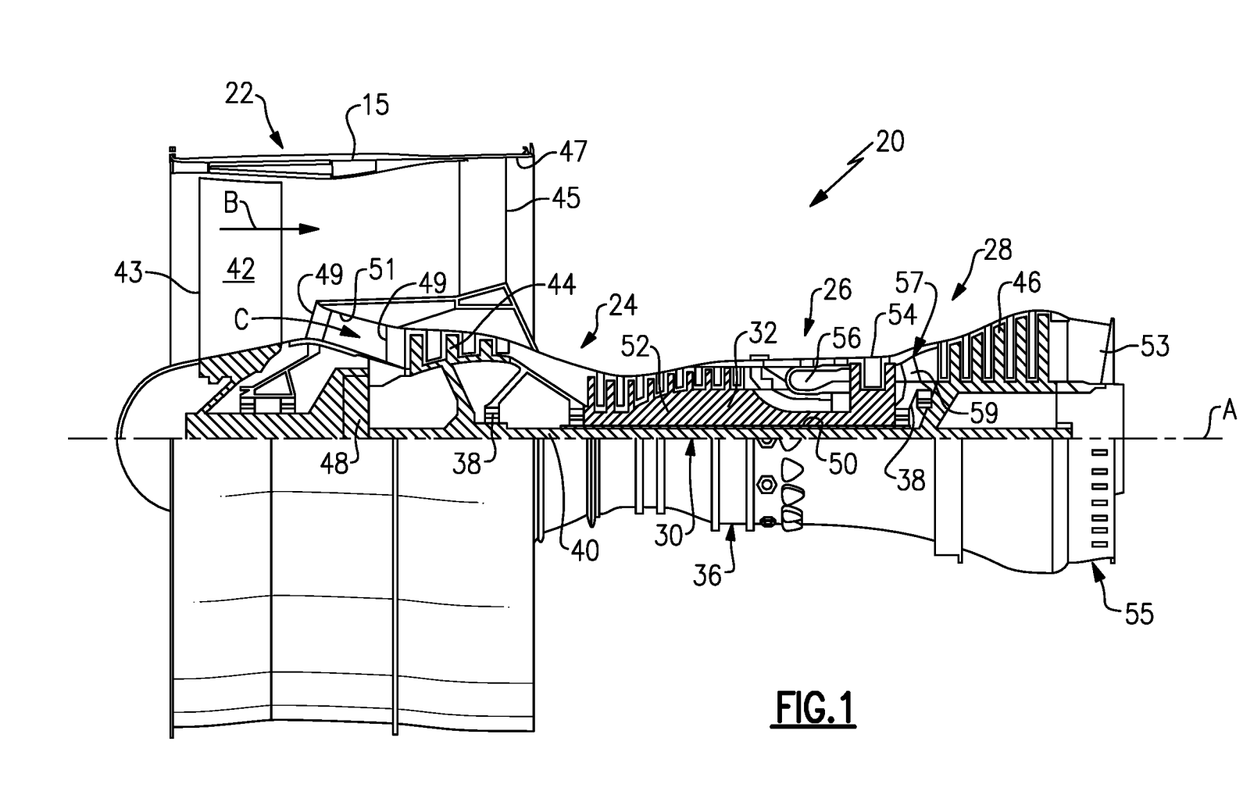
FIG. 1 illustrates an example turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }° R)/(518.7° R)]^{0.5}$. The "Low corrected fan tip speed" as disclosed herein according to one non-limiting embodiment is less than about 1150 ft/second (350.5 meters/second).

The fan 42 includes an array of fan blades 43 (one shown) circumferentially distributed about the engine longitudinal axis A. The fan blades 43 are rotatable about the engine longitudinal axis A to deliver airflow to the bypass and core flow paths B, C.

The engine 20 includes an array of fan exit guide vanes 45 (one shown) circumferentially distributed about the engine longitudinal axis A. Each guide vane 45 is dimensioned to span between an inner diameter and outer diameter of bypass duct 47 to structurally support a portion of the engine static structure 36 including the compressor section 25. Each guide vane 45 can be dimensioned to set a direction of airflow in the bypass flow path B. The engine 20 can include a plurality of exit guide vanes 53 (one shown) that extend from a turbine exhaust case (TEC) 55 to structurally support a portion of the turbine section 28.

The engine 20 can include one or more arrays of inlet guide vanes 49 circumferentially distributed about the engine longitudinal axis A. Each inlet guide vane 49 is dimensioned to span between an inner diameter and outer diameter of core duct 51 to structurally support a portion of the compressor section 24 and/or to set a direction of airflow in the core flow path C into and/or across the compressor section 24.

Figure 2:
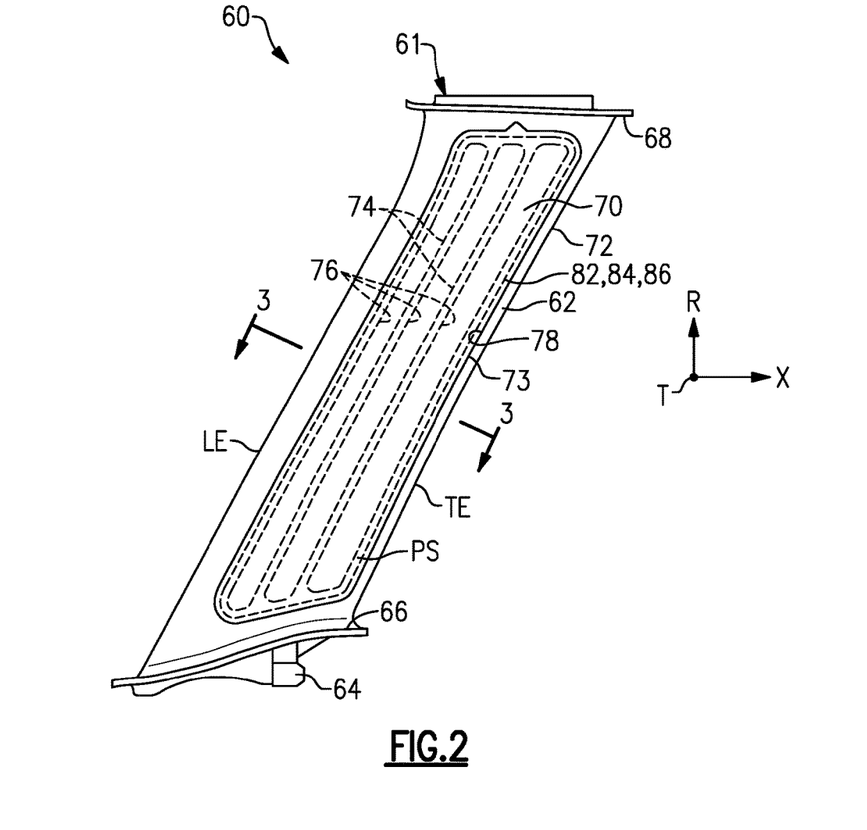
FIG. 2 illustrates a side view of a gas turbine engine component.
Figure 3:
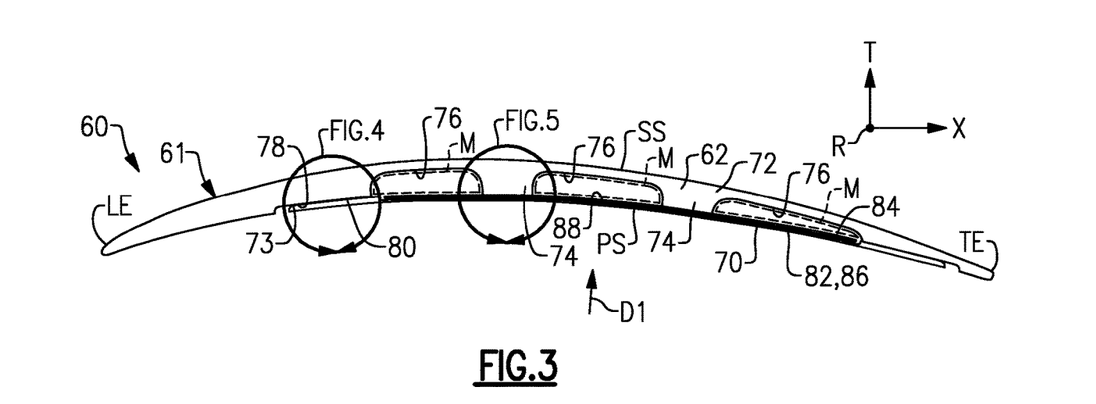
FIG. 3 illustrates a sectional view of the gas turbine engine component taken along line 3-3 of FIG. 2.

FIGS. 2 and 3 illustrate a gas turbine engine component 60 according to an example. The component 60 can be incorporated in the engine 20 of FIG. 1, for example. In the illustrated example of FIGS. 2 and 3, the component 60 is an airfoil 61. The airfoil 61 can be a structural guide vane, such as one of the guide vanes 45, 49, 53 or a vane in the mid-turbine frame 57 of FIG. 1, that is dimensioned to set a direction of airflow in the fan section 22, compressor section 24 and/or turbine section 28, for example. Other types of airfoils, including rotatable blades such as fan blade 43 of FIG. 1, as well as vanes and struts in the fan, compressor and turbine sections 22, 24, 28 may benefit from the examples disclosed herein which are not limited to the design shown. Other parts of the gas turbine engine 20 may benefit from the examples disclosed herein, including industrial turbines.

The airfoil 61 includes an airfoil section 62 extending in a spanwise or radial direction R from a root section 64 (FIG. 3). The root section 64 is configured to mount the airfoil 61 in the engine 20. Generally, one side of the airfoil section 62 is a suction side SS (FIG. 3) and the other side is a pressure side PS separated in a thickness direction T. The pressure side PS has a generally concave profile, and the suction side SS has a generally convex profile. The airfoil section 62 extends in the thickness direction T between the pressure and suction sides PS, SS to define an aerodynamic surface contour of the airfoil section 62, as illustrated in FIG. 3.

The airfoil 61 can include an inner (or first) platform section 66 and an outer (or second) platform section 68 (FIG. 2). The platform sections 66, 68 can be dimensioned to define an aerodynamic surface contour that bounds a gas path, such as one of the bypass and core flow paths B, C (FIG. 1). The airfoil section 62 extends in the radial direction R from, and between, the platform sections 66, 68. The airfoil section 62 extends in a chordwise direction X between a leading edge LE and a trailing edge TE.

The airfoil section 62 includes a first skin (or cover) 70 and a main body (or second skin) 72. The main body 72 defines the leading and trailing edges LE, TE and the pressure and suction sides PS, SS. The first skin 70 is disposed on a surface of the main body 72 such that the first skin 70 and main body 72 cooperate to define the pressure and suction sides PS, SS. The first skin 70 can be dimensioned to extend between the leading and trailing edges LE, TE. In the illustrative example of FIGS. 2 and 3, the first skin 70 is spaced apart from the leading and trailing edges LE, TE. The first skin 70 is arranged to provide a continuous surface with the suction side SS of the airfoil 61. In another example, the first skin 70 is disposed on the pressure side PS of the airfoil 61. The component 60 can include two or more cover skins along each of the pressure and/or suction sides PS, SS of the airfoil 61.

The first skin 70 and main body 72 can be made out of metallic materials such as titanium or aluminum. Other example materials include metal alloys, metal matrix composites and ceramic matrix composites.

Referring to FIG. 3 with continuing reference to FIG. 2, the main body 72 includes one or more internal ribs 74 that define one or more internal cavities or channels 76 (also shown in dashed lines in FIG. 2 for illustrative purposes). In the illustrative example of FIGS. 2 and 3, the main body 72 includes two internal ribs 74 that define three separate and distinct internal channels 76. It should be appreciated that fewer or more than two internal ribs 74 and three internal channels 76 can be utilized in view of the teachings disclosed herein, such as only two internal channels 76 on opposed sides of one internal rib 74. The internal ribs 74 can serve to provide rigidity to the component 60. The internal ribs 74 and internal channels 76 can be defined having different dimensions, shapes and/or at other orientations than illustrated by FIGS. 2 and 3.

The internal channels 76 can be substantially or completely free of any material such that the airfoil section 62 is hollow in an assembled or finished state, which can reduce a weight of the component 60. In other examples, the internal channel(s) 76 are at least partially or completely filled with a material M (shown in dashed lines for illustrative purposes). Example materials M include metallic and non-metallic foams and composites.

Figure 4:
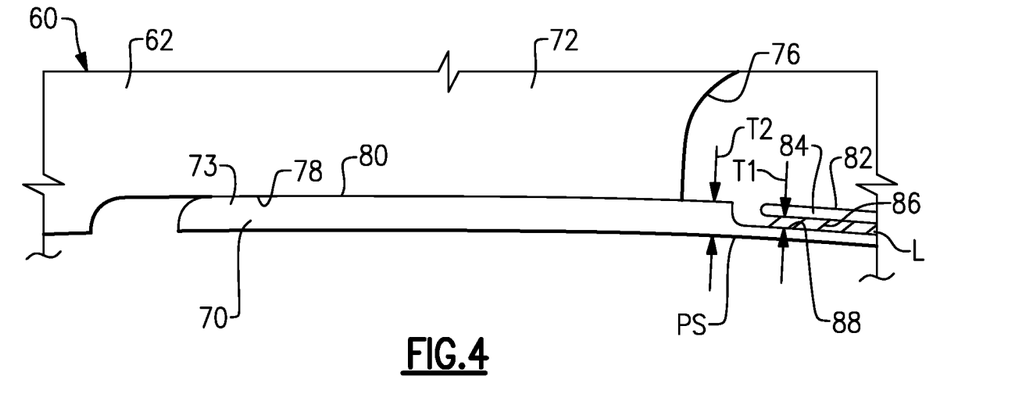
FIG. 4 illustrates a portion of the gas turbine engine component of FIG. 3 including a damper.

Referring to FIG. 4, with continuing reference to FIGS. 2 and 3, the main body 72 defines an external recess 78 that is dimensioned to at least partially receive the first skin 70. A perimeter 73 of the first skin 70 is received in the external recess 78. The first skin 70 is attached to the main body 72 to enclose the internal channels 76 such that the main body 72 and first skin 70 cooperate to define the pressure and suction sides PS, SS. In the illustrative example of FIGS. 2-4, the perimeter 73 of the first skin 70 is attached to the main body 72 along an interface 80 defined by a face of the external recess 78. Various techniques can be utilized for attaching the first skin 70 to the main body 72, including laser or electron beam welding, brazing, diffusion bonding or another fastening technique.

Figure 5:
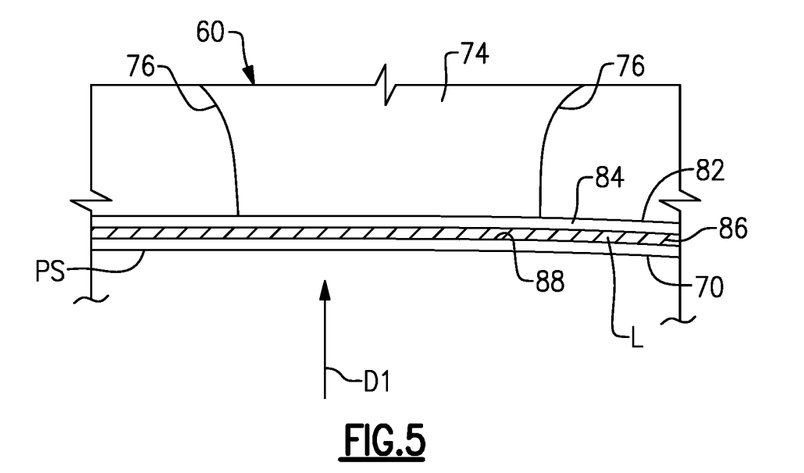
FIG. 5 illustrates another portion of the gas turbine engine component of FIG. 3 including the damper.

The component 60 can experience vibration and other loads during engine operation. Referring to FIG. 5, with continuing reference to FIGS. 2-4, the component 60 includes at least one damper 82 having a damping member 86 that serves to damp or attenuate vibration and other loads between the first skin 70 and main body 72. The damper 82 can include a carrier 84 that mounts the damping member 86 (82, 84 and 86 also shown in dashed lines in FIG. 2 for illustrative purposes). The carrier 84 can be made of any of the materials disclosed herein regarding the first skin 70 and/or main body 72. The carrier 84 can have a generally planar geometry made from a sheet metal body, for example. The damping member 86 is mechanically attached to surfaces of the carrier 84.

In the illustrative example of FIGS. 2-3 and 5, the carrier 84 and damping member 86 are dimensioned to span across each of the internal ribs 74 such the damping member 86 is sandwiched or otherwise constrained between surfaces of the first skin 70 and surfaces of the carrier 84 to distribute vibration and other loads between the first skin 70 and main body 72. The carrier 84 can be mechanically attached to each of the ribs 74 utilizing any of the techniques disclosed herein.

The damping member 86 is made of at least one layer L of damping material that is sandwiched or otherwise constrained between the first skin 70 and internal ribs 74. The first skin 70 defines an internal recess 88 that is dimensioned to face the internal ribs 74. The internal recess 88 is dimensioned to at least partially receive the damper 82, including the layer(s) L of damping material of the damping member 86. The damper 82 can be spaced apart from a perimeter of the internal recess 88, and a maximum thickness T1 of the damping member 86 can be less than a maximum thickness T2 of the first skin 70 along a perimeter of the internal recess 88 with respect to the thickness direction T, as illustrated by FIG. 4. The internal recess 88 can be dimensioned such that the carrier 84 and damping member 86 are completely received in the internal recess 88, as illustrated by FIGS. 4 and 5. The damping member 86 is sandwiched between or otherwise constrained between the first skin 70 and carrier 84 in an installed position.

The damping member 86 spans across the internal ribs 74 and is attached to surfaces of the internal recess 88 and carrier 84 such that the layer(s) L of damping material oppose movement of the first skin 70 relative to the main body 72 in at least one, more than one and/or each of the spanwise, chordwise and thickness directions R, X, T. Various techniques can be utilized to attach the damping member 86 to surfaces of the internal recess 88 and/or carrier 84, including bonding surfaces of the internal recess 88 and damping member 86 with a bonding material such as an epoxy or bonding directly during the cure operation of the damping member 86, for example.

Various damping materials can be utilized for each layer L, including viscoelastic materials. Viscoelasticity is the property of a material that exhibits both viscous and elastic characteristics under stress and deformation, as is known. Viscous materials resist shear flow and strain linearly when a stress is applied, whereas elastic materials strain when stretched and immediately return to their original state upon removal of the stress. Example viscoelastic materials include rubber and polymers. Example polymers include amorphous and semi-crystalline polymers. The damping material can be selected with respect to a predefined frequency and/or temperature threshold or range, for example.

Figure 6:
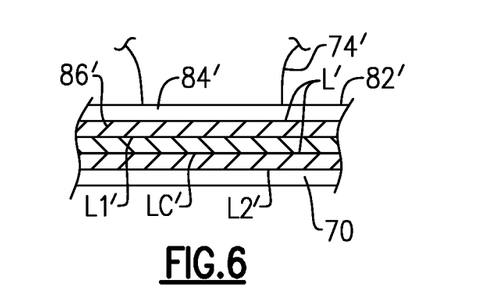
FIG. 6 illustrates a damper according to another example.

In the illustrative example of FIG. 6, damping member 86' includes a plurality of layers L' of damping material (indicated as layers L1'-L2') in stacked relation between internal rib 74' and surfaces of internal recess 88'. Two layers L1'-L2' are shown. However, it should be understood that more than two layers L1'-L3' can be utilized in accordance with the teachings disclosed herein. Layers L1'-L2' can be the same in construction or may differ. For example, each of the layers L1'-L2' can include damping material having the same viscoelasticity. In another example, one or more of the layers L' (e.g., layer L1') has a construction that differs in viscoelasticity from a construction of the remaining layers L' (e.g., layer L2'). The layers L' and constraining layer LC' can be constructed according to predefined damping characteristics of the damping member 86', different expected vibratory modes experienced by the component 60 during engine operation and/or to establish a relative wider effective temperature range of the component 60, including material construction and/or thickness.

The component 60 can be formed and assembled as follows. Referring to FIG. 3, internal channels 76 are formed in the main body 72 between the internal ribs 74. An internal recess 88 can be formed in the first skin 70 to at least partially receive the damper 82. The internal channels 76 and internal recess 88 can be formed in the component 60 utilizing a casting or machining technique, for example. The damping member 86 is mechanically attached to the carrier 84 to define a cartridge or assembly. Referring to FIGS. 3 and 5, the damper 82 is moved in a direction D1 and is at least partially inserted into the main body 72 such that the damper 82 is positioned across the internal ribs 74. First skin 70 is moved in direction D1 and brought into abutment with the main body 72 and damper 82. In other examples, the damper 82 and first skin 70 are moved together in direction D1 and brought into abutment with the main body 72.

The perimeter 73 of the first skin 70 is attached to the main body 72 and the carrier 84 is attached to the internal ribs 74 utilizing any of the techniques disclosed herein to enclose the internal channels 76 and to sandwich the damper 82 between the first skin 70 and internal ribs 74. The damping member 86, including the layer(s) L of damping material, is mechanically attached to surfaces of the internal recess 88 of the first skin 70 and to the carrier 84 utilizing any of the techniques disclosed herein. In some examples, the damping material includes viscoelastic material that is deposited along surfaces of the first skin 70 and/or carrier 84 in an uncured and partially cured state. The viscoelastic material can be cured together with the first skin 70 and carrier 84 prior to securing the damper 82 to the main body 72. In the installed position, the layer(s) L of viscoelastic material of the damping member 86 oppose movement of the first skin 70 relative to the main body 72. The carrier 84 can be mechanically attached to the internal ribs 74 with a bonding material such as an epoxy, for example.

Figure 7:
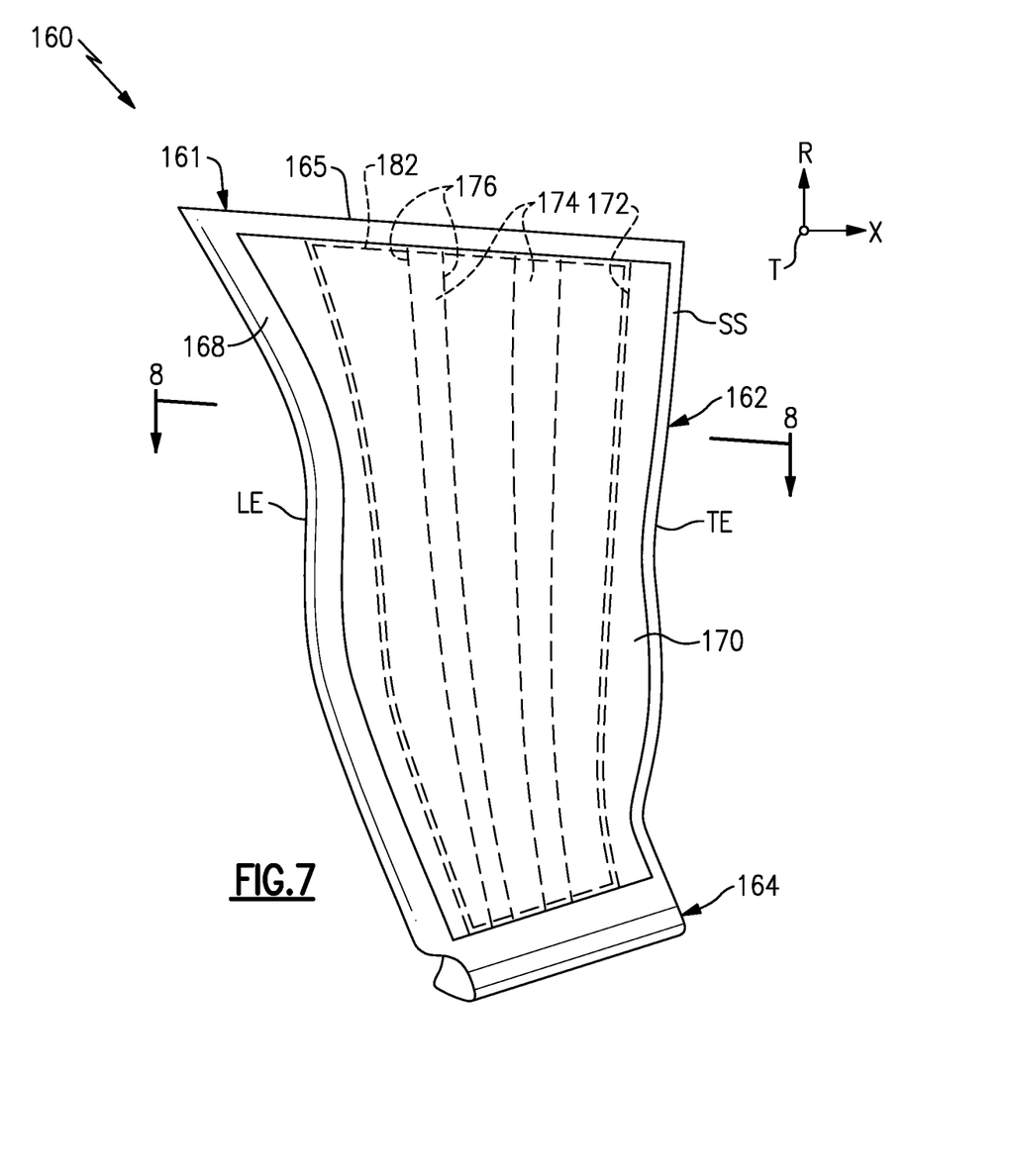
FIG. 7 illustrates a perspective view of a gas turbine engine component according to another example.
Figure 8:
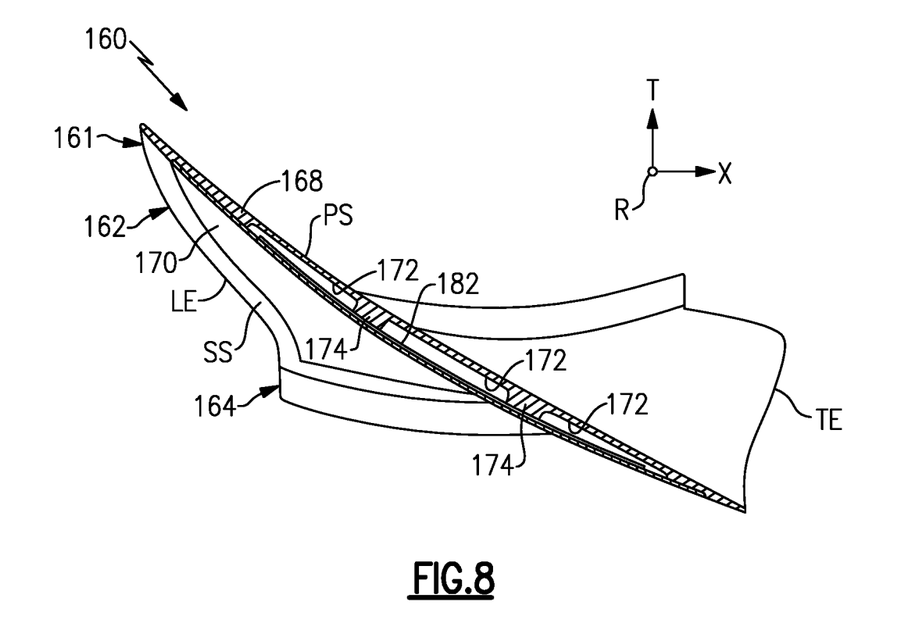
FIG. 8 illustrates a sectional view of the gas turbine engine component taken along line 8-8 of FIG. 7.

FIGS. 7 and 8 illustrate a component 160 according to another example. In this disclosure, like reference numerals designate like elements where appropriate and reference numerals with the addition of one-hundred or multiples thereof designate modified elements that are understood to incorporate the same features and benefits of the corresponding original elements. In the illustrated example of FIGS. 7 and 8, the component 160 is a rotatable blade or airfoil 161. The airfoil 161 can be a fan blade 43 incorporated into the engine 20 of FIG. 1, for example. The airfoil 161 includes an airfoil section 162 that extends in a spanwise or radial direction R from a root section 164 to a tip portion 165. The root section 164 is a shape that is configured to mount the fan blade 43 in the engine 20, such as a dovetail shape. The tip portion 165 is a terminal end of the airfoil 161.

The airfoil section 162 includes a first skin (or cover) 170 mechanically attached to a main body (or second skin) 172. The airfoil 161 including the first skin 170 and main body 172 can be made of any of the materials disclosed herein. The main body 172 includes a plurality of internal ribs 174. The internal ribs 174 define a plurality of internal channels 176 in a thickness of the main body 172. The airfoil 161 includes a damper 182 that is dimensioned to span across the internal ribs 174, as illustrated by FIG. 8 (also shown in dashed lines in FIG. 7 for illustrative purposes). The damper 182 can be arranged between attached to the first skin 170 and internal ribs 174 utilizing any of the techniques disclosed herein to oppose movement of the first skin 170 relative to the main body 172 in the spanwise, chordwise and/or thickness directions R, X, T.

Figure 9:
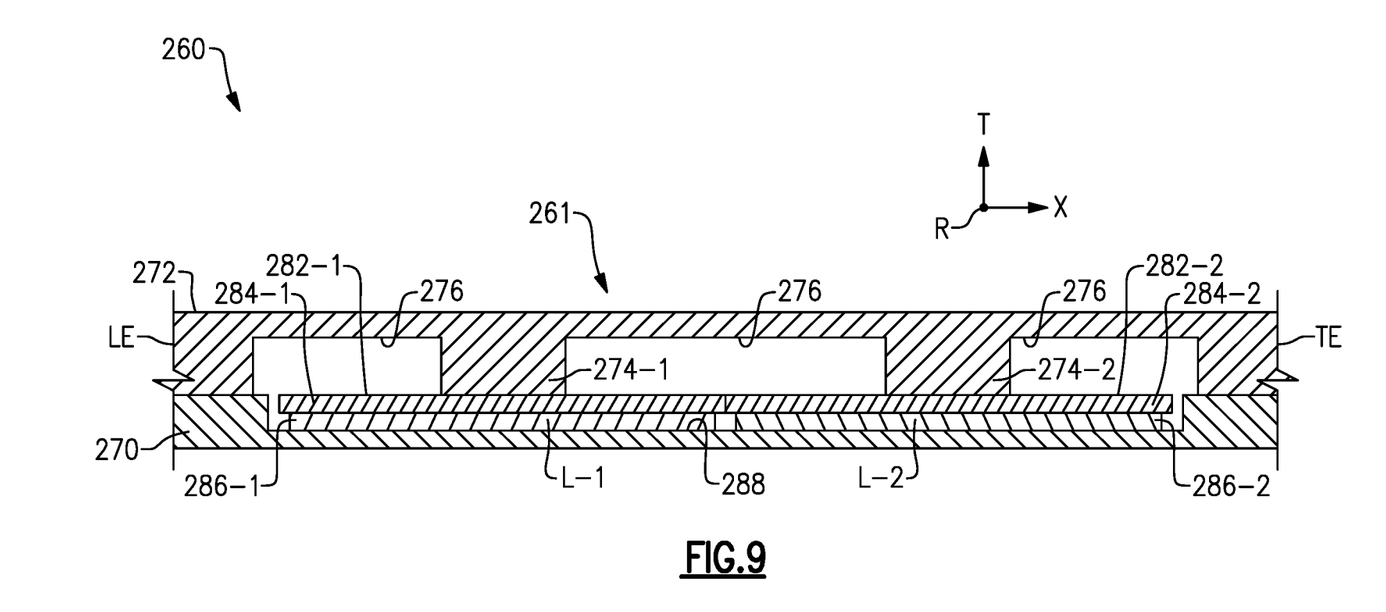
FIG. 9 illustrates a sectional view of a gas turbine engine component according to yet another example.

FIG. 9 illustrates a component 260 according to another example. The component 260 can be an airfoil 261, including any of the airfoil arrangements disclosed herein, and can be incorporated into a portion of the engine 20 of FIG. 1. The component 260 includes a plurality of internal ribs 274 (indicated at 274-1, 274-2) defined in a thickness of main body (or second skin) 272.

The component 260 includes a plurality of dampers 282 (indicated at 282-1, 282-2) mechanically attached to a first skin (or cover) 270. The dampers 282-1, 282-2 are at least partially received in an internal recess 288 defined in the first skin 270 and can be axially arranged in sequence in a chordwise direction X, for example. For example, damper 282-1 can be arranged adjacent to leading edge LE, and damper 282-2 can be arranged adjacent to trailing edge TE. Damper 282-1 is dimensioned to extend across the internal rib 274-1, and damper 282-2 is dimensioned to extend across the internal rib 274-2. Each damper 282-1, 282-2 includes a respective carrier 284-1, 284-2 and damping member 286-1, 286-2. The damping members 286-1, 286-2 can be arranged in direct abutment or can be spaced apart. Each damping member 286-1, 286-2 is made of at least one layer L-1, L-2 of damping material that is sandwiched or otherwise constrained between the first skin 270 and internal ribs 274-1, 274-2, respectively. Each damper 282-1, 282-2 can be constructed and attached to the first skin 270 and internal ribs 274-1, 274-2 utilizing any of the techniques disclosed herein.

The layers L-1, L-2 of the respective damping members 286-1, 286-2 can be the same in construction or may differ. For example, each of the layers L-1, L-2 can include damping material having the same viscoelasticity. In another example, layer L-1 has a construction that differs in viscoelasticity from a construction of layer L-2. Layers L1, L2 can be constructed according to expected vibratory modes during engine operation, which may differ for localized portions of the component 160. Constructing the layers L1, L2 relative to different expected vibratory modes for the localized portions of the component 160 can improve durability and aerodynamic efficiency.

Utilizing the techniques disclosed herein, bonding or otherwise mechanically attaching the damping member 86/186/286 to the first skin 70/170/270 and internal ribs 74/174/274 of the main body 72/172/272 causes relative motion or energy to pass through the damping member 86/186/286 to establish a shear tie, which damps or attenuates vibration and other loads during engine operation and can improve durability of the component 60/160/260.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An airfoil for a gas turbine engine comprising:
an airfoil section extending in a spanwise direction, extending between a leading edge and a trailing edge in a chordwise direction, and extending in a thickness direction between a pressure side and a suction side;
wherein the airfoil section includes a main body and a first skin, the main body includes a plurality of ribs defining a plurality of internal channels, the first skin is attached to the main body to enclose the plurality of internal channels such that the main body and the first skin cooperate to define the pressure and suction sides;
a damper including at least one layer of damping material sandwiched between the first skin and the plurality of ribs; and
wherein the damper includes a carrier that spans across and it attached to the plurality of ribs such that the carrier is interposed between the plurality of ribs and the first skin, the at least one layer of damping material is attached to surfaces of the carrier, and wherein the carrier, the main body and the first skin are separate and distinct components.

2. The airfoil as recited in claim 1, wherein the at least one layer of damping material comprises viscoelastic material.

3. The airfoil as recited in claim 2, wherein the main body and the first skin are metallic.

4. The airfoil as recited in claim 2, wherein the first skin defines a recess that is dimensioned to at least partially receive the at least one layer of damping material.

5. The airfoil as recited in claim 4, wherein the at least one layer of damping material is attached to surfaces of the recess such that the at least one layer of damping material opposes movement of the first skin relative to the main body in at least one of the spanwise direction and the chordwise direction.

6. The airfoil as recited in claim 5, wherein:
the main body, the first skin and the carrier are metallic;
the recess is defined in a thickness of the first skin; and
a perimeter of the first skin is attached to the main body along an interface.

7. The airfoil as recited in claim 6, wherein:
the carrier is spaced apart from the interface;
the recess is dimensioned to at least partially receive the at least one layer of damping material and the carrier such that the at least one layer of damping material is sandwiched between surfaces of the recess and the surfaces of the carrier; and
the plurality of internal channels are hollow.

8. The airfoil as recited in claim 1, wherein a perimeter of the first skin is attached to the main body along an interface.

9. The airfoil as recited in claim 1, wherein:
the first skin defines a recess in a thickness of the first skin, and the recess is dimensioned to at least partially receive the at least one layer of damping material and the carrier such that the at least one layer of damping material is sandwiched between surfaces of the recess and the surfaces of the carrier; and
the plurality of internal channels are hollow.

10. The airfoil as recited in claim 9, wherein:
at least one layer of damping material includes first and second layers of viscoelastic material in stacked relation between the plurality of ribs and the surfaces of the recess; and
the first layer has a construction that differs in viscoelasticity from a construction of the second layer.

11. The airfoil as recited in claim 1, wherein:
the plurality of ribs includes a first rib and a second rib;
the damper is a first damper and a second damper, the first damper extending across the first rib, the second damper extending across the second rib; and
the at least one layer of damping material of the first damper differs in construction from the at least one layer of damping material of the second damper.

12. The airfoil as recited in claim 1, wherein the airfoil is a guide vane.

13. The airfoil as recited in claim 1, wherein the airfoil is a fan blade.

14. A gas turbine engine comprising:
a fan section;
a compressor section;
a combustor section in fluid communication with the compressor section;
a turbine section that drives the compressor section and the fan section; and
an array of airfoils circumferentially distributed about an engine longitudinal axis, wherein each airfoil of the array of airfoils comprises:
an airfoil section including a main body and a first skin, the main body including a plurality of ribs defining a plurality of internal channels, the first skin attached to the main body to enclose the plurality of internal channels;
a damper including at least one layer of damping material that spans across the plurality of ribs such that the at least one layer of damping material opposes movement of the first skin relative to the main body; and
wherein the damper includes a carrier that spans across and is attached to the plurality of ribs such that the carrier is interposed between the plurality of ribs and the first skin, and the at least one layer of damping material is attached to surfaces of the carrier, and wherein the carrier, the main body and the first skin are separate and distinct components.

15. The gas turbine engine as recited in claim 14, wherein the at least one layer of damping material comprises viscoelastic material, and the main body and the first skin are metallic.

16. The gas turbine engine as recited in claim 15, wherein the first skin defines a recess, the at least one layer of damping material is attached to surfaces of the recess, and the plurality of internal channels are hollow.

17. The gas turbine engine as recited in claim 14, wherein the fan section comprises the array of airfoils, and the array of airfoils are an array of fan blades rotatable about the engine longitudinal axis.

18. The gas turbine engine as recited in claim 14, wherein the array of airfoils are guide vanes that set a direction of flow in the fan section and/or the compressor section.

19. A method of forming a gas turbine engine component comprising:
forming a plurality of internal channels in a main body between a plurality of internal ribs;
positioning a damper including at least one layer of viscoelastic material across the plurality of internal ribs, wherein the damper includes a carrier attached to the at least one layer of viscoelastic material;
attaching a first skin to the main body to sandwich the damper between the first skin and the plurality of ribs such that at least one layer of viscoelastic material opposes movement of the first skin relative to the main body; and
attaching the carrier to the plurality of internal ribs such that the carrier is interposed between the plurality of ribs and the first skin, and wherein the carrier, the main body and the first skin are separate and distinct components.

20. The method as recited in claim 19, wherein the main body and the first skin are metallic.

21. The method as recited in claim 19, further comprising:
forming a recess in a thickness of the first skin; and
attaching the at least one layer of damping material to surfaces of the recess;
wherein the step of attaching the carrier to the plurality of internal ribs occurs such that the at least one layer of damping material is sandwiched between the surfaces of the recess and the carrier; and
wherein the step of attaching the first skin to the main body includes attaching a perimeter of the first skin to the main body to enclose the plurality of internal channels.

22. The method as recited in claim 21, wherein:
the main body, the first skin and the carrier are metallic; and
the gas turbine engine component is a fan blade.

* * * * *